Patented June 10, 1924.

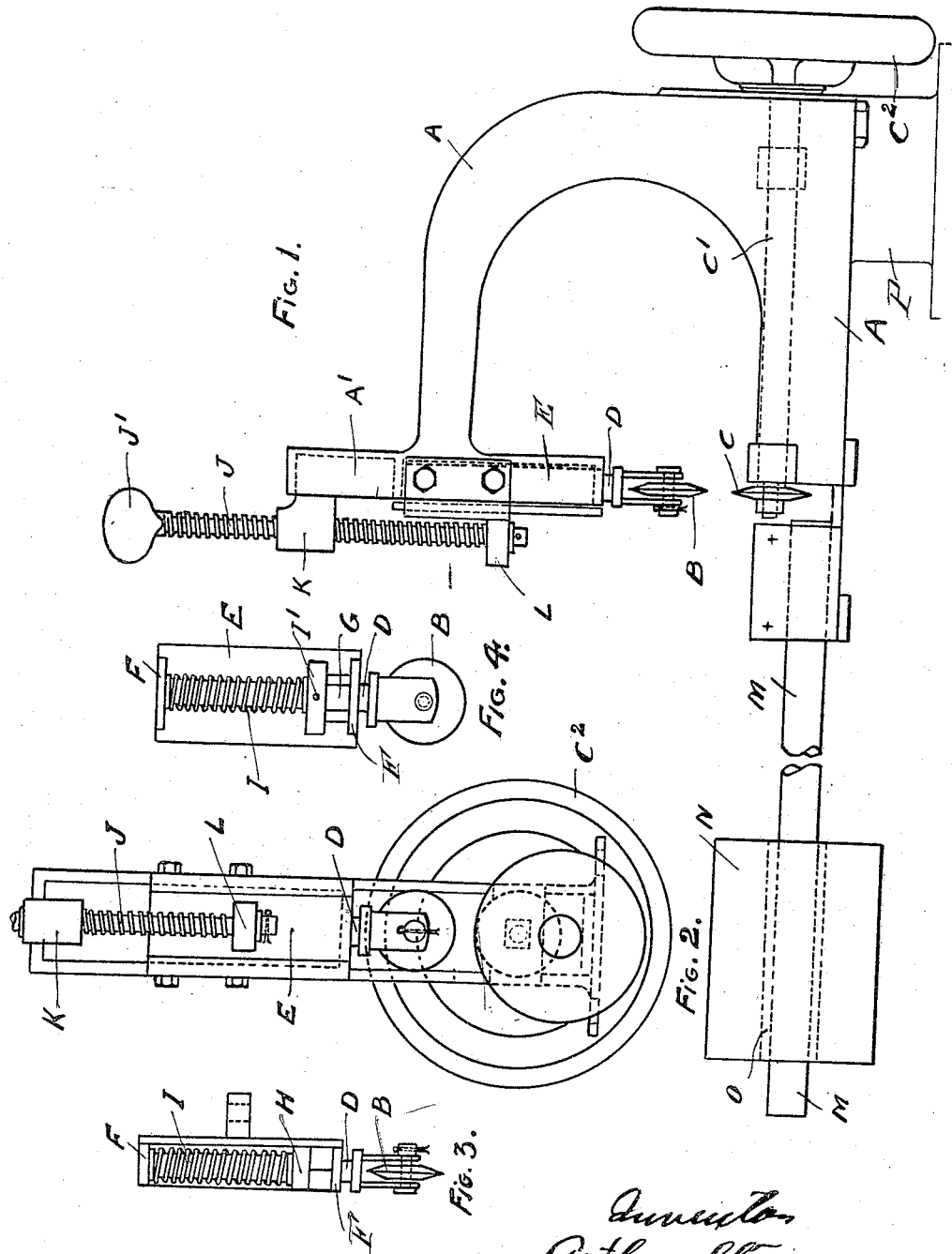

1,497,389

UNITED STATES PATENT OFFICE.

ARTHUR STONE, OF LEEDS, ENGLAND.

APPARATUS FOR CUTTING SLATES, TILES, PIPES, AND THE LIKE.

Application filed September 27, 1921. Serial No. 503,481.

*To all whom it may concern:*

Be it known that I, ARTHUR STONE, a subject of the King of Great Britain and Ireland, residing at Leeds, in the county of York, England, have invented a new and useful Improvement in Apparatus for Cutting Slates, Tiles, Pipes, and the like, of which the following is a specification.

This invention relates to apparatus for cutting slates, tiles, red or blue capped ridges and the like in a hard-burnt or finished condition, and marble artificial stone uralite asbestos or other similar slabs used in the art of building construction, and of the kind comprising a pair of vertical wheel cutters the upper of which is elastically supported from a curved arm or bracket over the lower cutter and is capable of adjustment by means of a screw, the chief object being to provide an improved apparatus or machine adapted for use in cutting pipes.

According to the invention the apparatus or machine comprises a frame or body part of hollow or channel section in which the curved arm or bracket is formed with a vertically disposed box head open at the lower end and front to receive a vertically adjustable slide carrying the spindle for the upper wheel cutter. The base of the machine is also provided with a horizontal spindle extending laterally therefrom and fitted with a roller for supporting the pipes to be cut.

In order that the invention may be clearly understood and readily carried into effect the same will now be more fully described with reference to the accompanying drawing in which:—

Figure 1 is a side elevation of the machine or apparatus embodying the invention.

Figure 2 is an end view of Figure 1.

Figure 3 is a side view of the slide and upper wheel cutter.

Figure 4 is a view as seen at right angles to Figure 3.

A is the frame or body part of the apparatus or machine of hollow, channel H-section with box head $A^1$, B and C are the upper and lower wheel cutters respectively. The upper cutter B is carried by the spindle D mounted in the slide E, between the lugs or flanges F on the slide E. A nut G and washer H, engages the lower portion of the spindle D between the flanges F. The washer H is adjustably secured to the spindle by means of a set screw or pin $I'$. A coil spring I is positioned on the spindle D between the upper flange F and the washer H and tends to normally exert a downward pressure on the washer so as to eliminate the possibility of the parts jamming, while in operation, or the liability of damaging the machine due to the unusual hardness of the material that is being cut. The vertical adjustment of the slide E in the head $A^1$ is effected by means of the screw J mounted in the boss K on the frame. At its lower end the screw J is secured to the boss L of the slide E so that, on turning the screw by means of the thumb piece $J^1$, the slide E may be caused to move up or down according to the desired position of the cutter B.

For supporting the pipes to be cut the spindle M extends from the base of the machine and is provided with a roller N bushed at O over which the pipe to be cut is passed. The turning of the lower cutter is effected by means of the spindle $C^1$ and hand wheel $C^2$. To permit of the base of the stand being raised and the pipe being cut to be passed over the cutter C a bracket P, preferably of L-shape formation may be attached to the base adjacent to the hand wheel $C^2$.

In operating the device the article to be cut is placed between the cutters or discs B and C. The upper cutter B is then adjusted by means of the screw J so as to bear or press under the pressure exerted by the spring I on the article to be cut. The lower cutter which has its cutting edge in direct vertical alignment with the corresponding edge on the cutter B is then actuated by the turning of the wheel $C^2$ so as to positively cut the article while the upper cutter B, being pressed or fed against the article by the spring I is also rotated and caused to be cut by the friction thus exerted.

The article, it will be observed, is fed by hand so as to control the line or position where the cut shall take place. It will thus be seen that the two cutters, upon the actuation of the wheel $C^2$, gradually cut toward each other until the article is completely severed.

By reason of the adjustment of the spring I on the spindle D, the pressure on the upper cutter may be regulated according to the substance of the article being cut, thus eliminating danger of the machine being damaged, due to the hardness of the article varying, which might under ordinary conditions cause the parts to be jammed together.

While I have for the purpose of illustration disclosed a preferred form of the invention, it is to be understood that the same may be varied within the limits of the appended claims without departing from the scope of the invention.

I claim:

1. A cutting device of the class described having in combination a base, an angular arm extending from said base provided at its free end with a depending guide, a lug projecting from said guide, a slide movable in said guide, and provided with a lug in alignment with said first mentioned lug, a spindle having a cutting disc journalled at its lower end, housed in said slide, a spring surrounding said spindle and positioned, between the ends of said slide, an operating screw extending through said lugs for moving the slide relative to said guide, a rotatable shaft extending through said base having fixedly secured at one end thereof a cutting disc in vertical alignment with said first mentioned disc, and means at its opposite end for rotating said shaft.

2. A cutting device of the class described having in combination a base, an angular arm extending from said base provided at its free end with a depending guide, a lug projecting from said guide, a slide movable in said guide and provided with a lug in alignment with said first mentioned lug, a spindle having a cutting disc journalled at its lower end, housed in said slide, a spring surrounding said spindle and positioned between the ends of said slide, an operating screw extending through said lugs for moving the slide relative to said guide, a rotatable shaft extending through said base having fixedly secured at one end thereof a cutting disc in vertical alignment with said first mentioned disc, means at its opposite end for rotating said shaft, and means mounted on said base and projecting laterally therefrom for supporting the article to be cut.

ARTHUR STONE.